(12) United States Patent
Nagasaka

(10) Patent No.: US 7,805,218 B2
(45) Date of Patent: Sep. 28, 2010

(54) ROBOT DEVICE AND CONTROL METHOD OF ROBOT DEVICE

(75) Inventor: Kenichiro Nagasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 1104 days.

(21) Appl. No.: 10/497,096

(22) PCT Filed: Sep. 30, 2003

(86) PCT No.: PCT/JP03/12474

§ 371 (c)(1),
(2), (4) Date: Dec. 28, 2004

(87) PCT Pub. No.: WO2004/030870

PCT Pub. Date: Apr. 15, 2004

(65) Prior Publication Data

US 2005/0107916 A1    May 19, 2005

(30) Foreign Application Priority Data

Oct. 1, 2002    (JP) ............................. 2002-288745

(51) Int. Cl.
G06F 19/00    (2006.01)
B25J 5/00    (2006.01)

(52) U.S. Cl. ...................... 700/245; 700/246; 700/251; 700/253; 700/260; 700/261; 318/568.12; 318/568.2; 318/568.22

(58) Field of Classification Search .................. 700/245, 700/246, 251, 253, 260, 261; 318/568.12, 318/568.2, 568.22

See application file for complete search history.

(56) References Cited

U.S. PATENT DOCUMENTS

| 4,860,215 | A | * | 8/1989 | Seraji | ......................... 700/260 |
| 4,974,210 | A | * | 11/1990 | Lee | ............................. 700/260 |
| 4,975,856 | A | * | 12/1990 | Vold et al. | .................. 700/263 |
| 4,999,553 | A | * | 3/1991 | Seraji | ......................... 700/245 |
| 5,179,514 | A | * | 1/1993 | Rastegar et al. | ............... 700/63 |
| 5,294,873 | A | * | 3/1994 | Seraji | ...................... 318/568.1 |
| 5,349,277 | A | * | 9/1994 | Takahashi et al. | ...... 318/568.12 |
| 5,355,064 | A | * | 10/1994 | Yoshino et al. | ........ 318/568.12 |
| 5,432,417 | A | * | 7/1995 | Takenaka et al. | ....... 318/568.12 |

(Continued)

FOREIGN PATENT DOCUMENTS

JP    7-287602    10/1995

(Continued)

Primary Examiner—Khoi Tran
Assistant Examiner—Ian Jen
(74) Attorney, Agent, or Firm—Oblon, Spivak, McClelland, Maier & Neustadt, L.L.P.

(57) ABSTRACT

A locomotion control system is constructed to input the quantity of materials in the real world, such as the quantity of motion state of a robot, external force and external moment, and environmental shapes, measured with sensors or the like. By integrating all calculations for maintaining a balance of the body into a single walking-pattern calculating operation, both a locomotion generating function and an adaptive control function are effectively served, the consistency of dynamic models is ensured, and interference between the dynamic models is eliminated. Calculations for generating a walking pattern of the robot can be performed in an actual apparatus and in real time in a manner in which parameters, such as a boundary condition concerning the quantity of motion state, external force and external moment, and the trajectory of the sole, are settable.

20 Claims, 9 Drawing Sheets

U.S. PATENT DOCUMENTS

| | | | | |
|---|---|---|---|---|
| 5,444,612 | A * | 8/1995 | Torii et al. | 700/41 |
| 5,483,630 | A * | 1/1996 | Unuma et al. | 345/475 |
| 5,579,442 | A * | 11/1996 | Kimoto et al. | 700/246 |
| 5,594,309 | A * | 1/1997 | McConnell et al. | 318/568.22 |
| 5,648,709 | A * | 7/1997 | Maeda | 318/568.17 |
| 5,808,433 | A * | 9/1998 | Tagami et al. | 318/568.12 |
| 5,838,130 | A * | 11/1998 | Ozawa | 318/568.2 |
| 5,872,893 | A * | 2/1999 | Takenaka et al. | 700/245 |
| 5,936,367 | A * | 8/1999 | Takenaka | 318/568.12 |
| 6,064,168 | A * | 5/2000 | Tao et al. | 318/568.21 |
| 6,243,623 | B1 * | 6/2001 | Takenaka et al. | 700/245 |
| 6,289,265 | B1 * | 9/2001 | Takenaka et al. | 700/245 |
| 6,294,890 | B1 * | 9/2001 | Shimada et al. | 318/570 |
| 6,438,454 | B1 * | 8/2002 | Kuroki | 700/245 |
| 6,534,943 | B1 * | 3/2003 | Hornby et al. | 318/568.12 |
| 6,580,969 | B1 * | 6/2003 | Ishida et al. | 700/245 |
| 6,584,377 | B2 * | 6/2003 | Saijo et al. | 700/245 |
| 7,158,840 | B2 * | 1/2007 | Jacques | 700/28 |
| 2002/0022907 | A1 * | 2/2002 | Takenaka et al. | 700/245 |

FOREIGN PATENT DOCUMENTS

JP  10-217161  8/1998

* cited by examiner

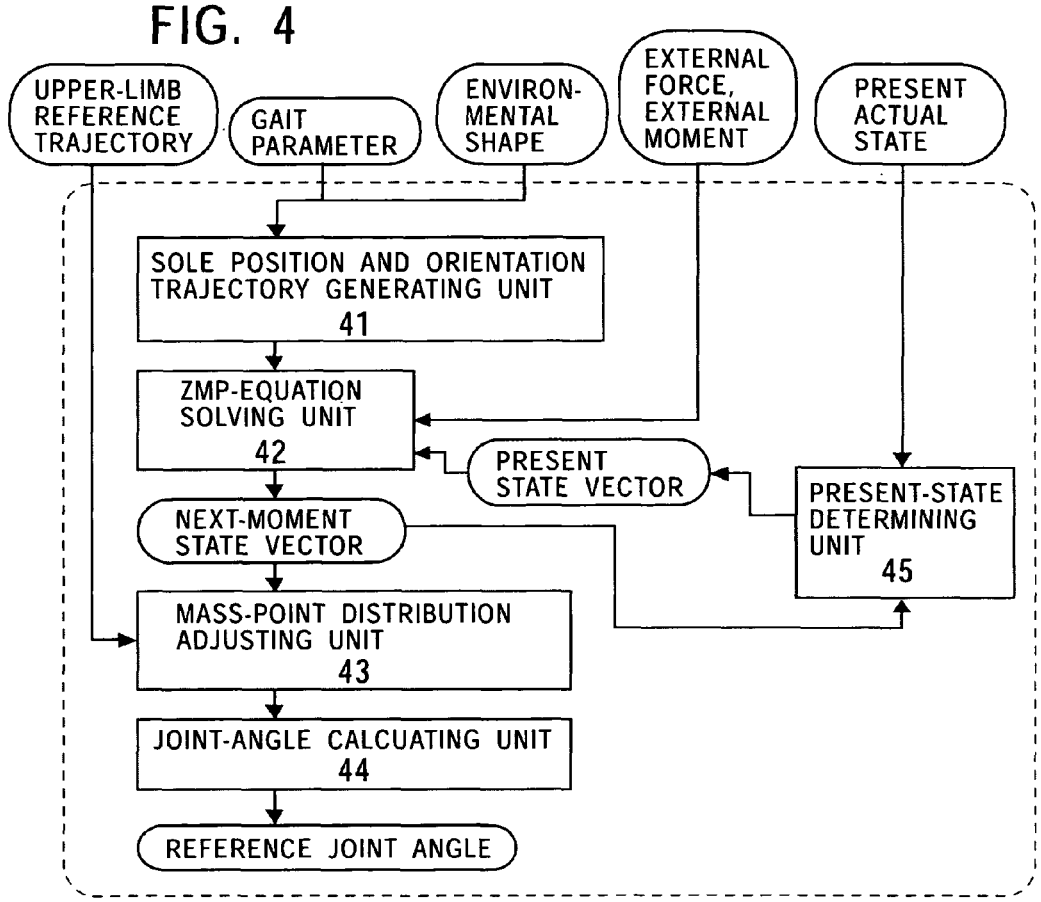
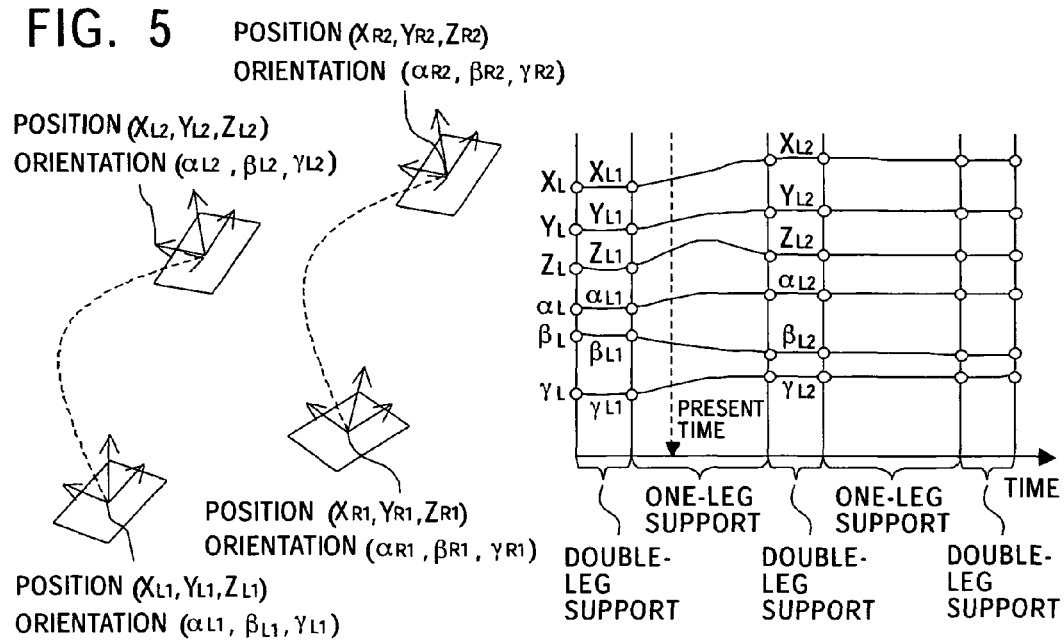

ROBOT DEVICE AND CONTROL METHOD OF ROBOT DEVICE

TECHNICAL FIELD

The present invention relates to a robot apparatus having at least a plurality of movable legs, and a control method for the robot apparatus, and particularly, to a robot apparatus that executes locomotion generation and adaptive control by using a predetermined dynamic model, and a control method for the robot apparatus.

More particularly, the present invention relates to a robot apparatus that generates a motion pattern, including a walking pattern, in an actual apparatus in real time, and a control method for the robot apparatus, and even more particularly, to a robot apparatus that properly controls the walking while ensuring the consistency between dynamic models for walking-pattern generation and various adaptive control operations, and a control method for the robot apparatus.

BACKGROUND ART

A mechanical apparatus, which makes motions similar to human motions by using an electrical or magnetic effect, is called a "robot". It is said that the term "robot" is originated from a Slavic word "ROBOTA" (a slave machine)". In Japan, robots started to be widely used in the late 1960s, most of which were industrial robots, such as manipulators and transfer robots, serving for automated and unmanned manufacturing operations in factories.

Recently, progress has been made in researches and developments concerning legged mobile robots that simulate the physical mechanisms or motions of animals walking in an erect posture on two legs, such as human beings or monkeys, and expectations of practical utilization thereof are growing. Although the movement in an erect posture on two legs is less stable and presents more difficulties in attitude control and ambulation control than in crawler-type, four-legged, and six-legged movements, it is excellent in realization of flexible ambulation, such as accommodation to walking surfaces presenting irregularities on the working trajectory, such as non-bulldozed lands or lands presenting obstacles, or to non-continuous walking surfaces, such as ascending and descending stairs and a ladder.

Legged mobile robots that emulate the bodily mechanisms and motions of human beings are particularly called "human type" or "human style" robots (humanoid robots). For example, humanoid robots are able to perform life support, that is, to support human activities in living environments and other situations in everyday life.

Most of the human working or living spaces are adapted to the bodily mechanism or behavioral pattern of human beings in the form of erect walking on two legs, and there are many obstacles therein for existing mechanical systems having wheels or other driving devices as transfer means. Therefore, in order for mechanical systems, that is, robots, to perform a variety of human operations and to infiltrate more into the living space of the human beings, it is preferable that the possible moving range of the robots be substantially equal to that of the human beings. This is the reason why the practical utilization of the legged mobile robots is greatly expected.

A large number of proposals have already been made in the technology concerning posture control and stable walking in legged mobile robot walking on two legs. The stable "walking" herein may be defined as "to move using legs without falling down". In order to prevent the robot from falling down, stable posture control of the robot is quite important. This is because falling implies interruption of the operation being executed by the robot, and a lot of time and labor is taken for the robot to erect itself from its fallen state and to restart the operation. This is also because the falling may inflict fatal damage not only to the robot itself, but also to the object colliding with the falling robot.

The majority of the proposals concerning stable attitude control and falling prevention during walking use the ZMP (Zero Moment Point) as the criterion of determining the walking stability. The verification criterion of the stability using the ZMP is based on "the d'Alembert's principle" that the gravitational force and inertial force acting from the walking system to the road, and the moments thereof are counterbalanced by the floor reactive force serving as the reactive force acting from the floor to the walking system, and the floor reactive moment. As the conclusion of the mechanical deduction, a point at which the pitching-axis and rolling-axis moments are zero, that is, "the zero moment point (ZMP)", lies on a side of a supporting polygon (i.e., ZMP stable area) defined by contact points of the soles with the road, and the road surface, or on the inner side thereof.

In short, the ZMP criterion states that "the robot can stably walk without falling down (the robot body does not turn) when the ZMP exists inside the supporting polygon defined by the feet and the road surface at any moment during walking, and a force for pushing the robot against the road surface acts".

A motion pattern (ex., a two-legged walking pattern) generated based on the ZMP criterion has the advantages, such as pre-settable sole contact points with the road surface and ease in taking account of the kinematic constraint conditions of the leg tips in conformity to the road surface shape. Moreover, since the use of the ZMP as the criterion for determining the stability means that the force is not used as a target value in motion control, but the trajectory is used, technical practicability is enhanced.

The concept of the ZMP and the application of the ZMP to the criterion for determining the stability of walking robots are taught in Miomir Vukobratovic, *Legged Locomotion Robots* (Ichiro Kato et al., *Hoko Robotto to Jinkou no Aashi*, (Nikkan Kogyo Shimbun, Ltd.)).

For example, a legged mobile robot disclosed in Japanese Unexamined Patent Application Publication No. H-5-305579 performs stable walking so that a point on the floor surface where ZMP is zero is controlled to coincide with a target value.

In a legged mobile robot disclosed in Japanese Unexamined Patent Application Publication No. H-5-305581, the ZMP is designed to be positioned inside a supporting polyhedron (polygon) or at least at a certain distance from the end of the supporting polygon when the leg touches or leaves the floor. In this case, the walking stability of the robot body is enhanced even under disturbance or the like because of the ZMP positioned at the given distance.

Japanese Unexamined Patent Application Publication No. H-5-305583 discloses that the walking speed of a legged mobile robot is controlled depending on the target ZMP position. That is, according to preset walking pattern data, the leg joints are driven to bring the ZMP into coincidence with the target position. Moreover, the tilt of the upper body is detected, and the output speed of the preset walking pattern data is changed depending on the detected value. For example, if the robot tilts forward as it tramps on unexpected irregularities, the output speed may be increased to recover its attitude. Also, since the ZMP is controlled to coincide with the target position, the output speed can be changed without any trouble during a double-leg support phase.

Japanese Unexamined Patent Application Publication No. H-5-305585 discloses that the landing position of a legged mobile robot is controlled by the ZMP target position. That is, the legged mobile robot disclosed in this publication achieves stable walking by detecting a difference between the ZMP target position and the actually measured position, and driving one or both of the legs to cancel the difference, or, alternatively, detecting the moment about the ZMP target position and driving the legs to reduce the moment to zero.

Japanese Unexamined Patent Application Publication No. H-5-305586 discloses controlling the tilting attitude of a legged mobile robot by the ZMP target position. That is, the moment about the ZMP target position is detected, and the legs are driven to reduce the moment to zero, thereby achieving stable walking.

A heavy processing load is imposed for generating a dynamic pattern including the solution of a ZMP equation. For this reason, in the majority of the known general locomotion control methods, calculations for generating a reference walking pattern are made off-line, and stabilizing calculations for accommodating unknown road surfaces and unknown external forces are made in the actual apparatus by using a simple dynamic model having a relatively light calculation load constructed corresponding to each adaptive control function.

In such a case, since the reference walking pattern is given as fixed data, it is impossible to meet various requests to change the locomotion. In order for the walking robot to freely move in a real environment, a function is needed that immediately reconfigures the general motion while maintaining a dynamic balance so as to meet motion change requests to the lower limbs and motion change requests to the upper limbs, such as the stride, walking cycle, turning angle, and lifting height of the leg, input at given times. However, in the conventional methods in which a walking pattern is generated off-line, a prepared walking pattern is simply carried out in the real environment without being changed.

For example, Japanese Unexamined Patent Application Publication No. H-10-86081 discloses a method in which several walking patterns each corresponding to one step are prepared off-line, and they are mixed and connected. However, it is impossible to cover all possible walking patterns, which can be said to be innumerable.

In a case in which a motion different from a motion assumed when a reference walking pattern is generated is requested of a specific joint (e.g., an upper limb of a humanoid robot) during execution time, since the motion of the specific joint is treated as a disturbance, the burden on the stabilizing algorithm is increased. When a there is an excessive deviation between the requested motion of the specific joint and the motion assumed when the reference walking pattern is generated, that is, the deviation is outside the allowable range of the stabilizing algorithm, the robot sometimes falls down. For example, when the mass of the upper limbs is large, it is considered that it is difficult to meet a motion request, for example, to violently swing the upper limbs at a given timing during walking.

Furthermore, since a simple dynamic model is constructed corresponding to each adaptive control function, expandability for adding adaptive control functions is low, and the amount of calculation is increased. Stabilizing algorithms corresponding to the adaptive control functions have a common purpose of stabilizing the locomotion, and often make substantially similar calculations. In an embedded CPU having limited calculation resources, it is important to integrate and save these calculations.

In order to reduce the load on the stabilizing calculations in the actual apparatus, a simple dynamic model is often introduced in each period corresponding to each adaptive control function. In other words, there is no consistency between dynamic models used in the generated walking pattern and various stabilizing algorithms. For this reason, unexpected interference occurs between different models. It is impossible to deny the probability that such an interference will cause phenomena, such as oscillation and divergence, in the control system and will reduce the walking performance. Various stabilizing algorithms, as well as the generated walking pattern, are not controlled by independent dynamics, but, in general, mutually interfere with one another. Therefore, it is preferable that operation be performed by sharing a consistent dynamic model constructed in consideration of mutual interference.

DISCLOSURE OF INVENTION

An object of the present invention is to provide a superior robot apparatus that can properly generate motion patterns including a walking pattern in an actual apparatus thereof and in real time, and a control method for the robot apparatus.

Another object of the present invention is to provide a robot apparatus that can execute proper walking control while ensuring a consistent dynamic model for the generation of a walking pattern and various adaptive control operations, and a control method for the robot apparatus.

A further object of the present invention is to provide a superior robot apparatus that can properly control the stabilization of a robot body in an embedded CPU having limited calculation resources, and a control method for the robot apparatus.

A still further object of the present invention is to provide a superior robot apparatus that can enhance the walking performance while sharing a consistent dynamic model constructed in consideration of mutual interference by adaptive control functions, and a control method for the robot apparatus.

The present invention has been made in view of the above problems, and provides a robot apparatus having a moving means, the robot apparatus including: a state detecting means for detecting the quantity of state of the robot apparatus; a real-time equation-of-motion solving means for finding a solution to an equation of motion with a boundary condition concerning the quantity of state of the robot apparatus; a boundary-condition setting means for setting the current quantity of state detected by the state detecting means as a boundary condition of the equation of motion with a boundary condition; a target-quantity-of-state calculating means for calculating the next-moment target quantity of state of the robot apparatus according to the solution to the equation of motion found by the real-time equation-of-motion solving means under the set boundary condition; and a motion-pattern generating means for generating a motion pattern of the robot apparatus on the basis of the target quantity of state.

Since the robot apparatus of the present invention has a real-time general-motion reconfiguring function that immediately meets motion change requests from a user program while maintaining a dynamic balance, information about the real world, such as the present actual state of the robot, actual environmental shapes, and external force, can be reflected.

That is, by inputting the actual state of the robot, actual environmental shapes, and external force as a boundary value and a constraint condition in the real-time general-motion reconfiguring calculation without separately making stabilizing calculations for accommodating unknown environments, both the calculation for generating a motion pattern, such as a walking pattern, and the stabilizing calculation can be made in one calculating operation for reconfiguring the real-time motion of the whole body.

Since the amount of calculation for controlling the stabilization of the walking of the robot is thereby saved, it is possible to construct a high-performance general-motion control system having a function of flexibly reflecting the motion requests and robustness, even in an embedded CPU having limited calculation resources.

In general, when different dynamic models are used for the generation of the walking pattern and various stabilizing operations, it is impossible to deny a probability that unexpected interference will occur between the dynamic models and will reduce the walking performance. In contrast, in the control method for the mobile robot according to the present invention, since a dynamic calculation is consistently performed in a single calculating operation for generating the walking pattern, such an unexpected interference is rarely caused between various algorithms, and high walking performance can be obtained.

While the equation of motion of the robot is expressed in a simple form, it is a variable coefficient differential equation, and it is not easy to find an analytic solution. Accordingly, a model is made in which a plurality of relatively short time periods are connected, and each of the short periods is approximately expressed by a simple ordinary differential equation under given assumptions, thereby simplifying the calculation. For example, for easy handling, the short periods may be separated on the boundaries between one-leg support phases and double-leg support phases.

Herein, the current quantity of state refers to the quantity of state of the robot apparatus in the present control cycle, and the next-moment target quantity of state refers to the target quantity of state of the robot apparatus in the next control cycle.

The state detecting means may use the position of the center of gravity of the robot or an N-th order differential value of the position of the center of gravity as the quantity of state of the robot apparatus.

Alternatively, the state detecting means may use the position of a part adjacent to the center of gravity of the robot or an N-th order differential value of the position of the part as the quantity of state of the robot apparatus.

For example, two-dimensional state vectors $[x, dx/dt]^T$ composed of the position of the center of gravity x of the body and the speed of the center of gravity dx/dt may be used as the quantity of state of the robot apparatus. Alternatively, in the case of a robot that walks in an erect posture on two legs, two-dimensional state vectors $[p, dp/dt]^T$ composed of the position p and the speed dp/dt of a specific portion near the center of gravity, such as the waist, or 2N-dimensional vectors $[p_1, p_2, \ldots P_N, dp_1/dt, dp_2/dt, \ldots, dp_N/dt]^T$ composed of the mass-point positions $p_i$ and the speeds $dp_i/dt$ (i represents the index of the mass point, and $i=1, \ldots, N$) in the whole body may be used as the quantity of state.

The real-time equation-of-motion solving means may use the ZMP equation of the robot as the equation of motion.

For example, the moving means is a leg including movable parts and links. In such a case, there may be further provided a real-time trajectory generating means for calculating a trajectory of the position or orientation of a leading-end link of the links in the leg in each control cycle, and an environmental-state measuring means for measuring the state of an environment around the robot apparatus. The real-time trajectory generating means can calculate the position and orientation of the leading-end link on the basis of the actual environmental state measured by the environmental-state measuring means, and the motion-pattern generating means can generate a motion pattern of the robot apparatus on the basis of the position and orientation of the leading-end link and the target quantity of state.

The robot apparatus of the present invention may further include an external-force detecting means for measuring the external force or external moment acting on the actual robot. In such a case, the real-time equation-of-motion solving means can find the solution to the equation of motion in consideration of the external force or moment calculated by the external-force detecting means.

Further objects, features, and advantages of the present invention will become apparent from the following detailed description of the embodiments with reference to the attached drawings.

BRIEF DESCRIPTION OF THE DRAWINGS

FIG. 4 is a schematic view showing the internal configuration of a real-time walking pattern generating unit 25.

FIG. 5 is a view showing the sole position and orientation trajectories.

BEST MODE FOR CARRYING OUT THE INVENTION

An embodiment of the present invention will be described in detail below with reference to the drawings.

Figure 1:
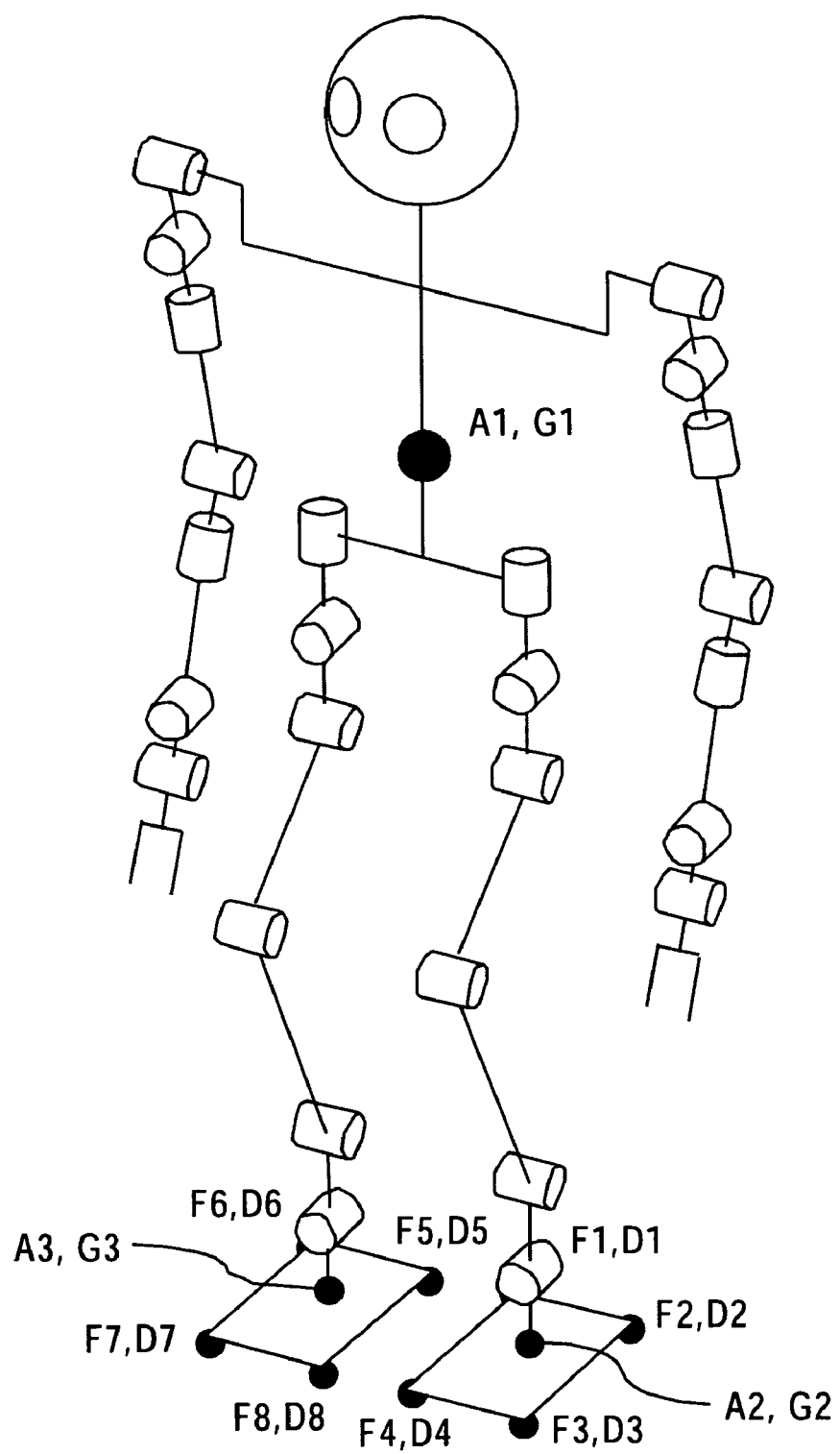
FIG. 1 is a schematic view showing the degree-of-freedom system in a legged mobile robot that carries out the present invention.

FIG. 1 schematically shows the degree-of-freedom system in a legged mobile robot that carries out the present invention.

A robot shown in the figure is a humanoid robot having two legs and two arms. The robot has a body with four limbs attached thereto, and includes right and left arms each having seven degrees of freedom of a shoulder joint pitching axis, a shoulder joint rolling axis, an upper-arm yawing axis, an elbow joint pitching axis, a forearm yawing axis, a wrist rolling axis, and a wrist pitching axis, and right and left legs each having six degrees of freedom of a hip joint yawing axis, a hip joint rolling axis, a hip joint pitching axis, a knee pitching axis, an ankle pitching axis, and an ankle rolling axis.

The degrees of freedom of the joints are, in reality, realized by actuator motors. In this embodiment, small AC servo actuators in which the gears are directly linked and a servo control system in the form a single chip is contained in a motor unit are mounted. This type of AC servo actuator is disclosed in, for example, Japanese Unexamined Patent Application Publication No. 2000-299970 (Japanese Patent Application No. 11-33386) which is assigned to the applicant of the present application.

An acceleration sensor A1 and a gyroscope G1 are mounted in the body. One-axis load cells (F1 to F8) for detecting the floor reactive force in a direction perpendicular to the sole surface and infrared ranging sensors (D1 to D8) for measuring the distance to the floor surface are mounted at the four corners of the right and left soles, four of the load cells and four of the sensors for the right sole, and the other four load cells and the other four sensors for the left sole. Acceleration sensors (A2 and A3) and gyroscopes (G2 and G3) are mounted at the centers of the right and left soles.

Figure 2:
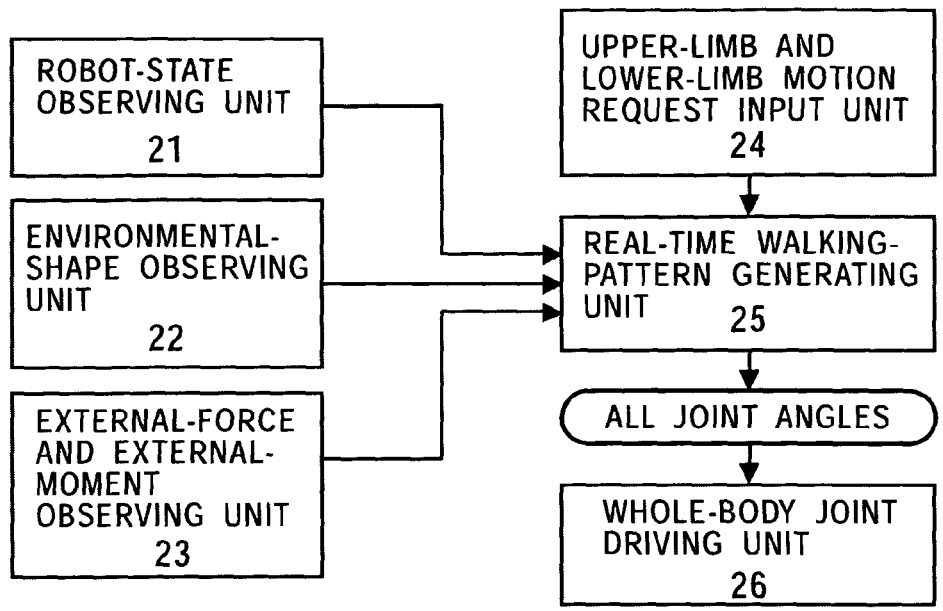
FIG. 2 is a schematic view showing the functional configuration of a locomotion control system applied to the legged mobile robot of an embodiment of the present invention.

FIG. 2 schematically shows the functional configuration of a locomotion control system applied to the legged mobile robot of this embodiment.

As shown in the figure, the locomotion control system includes a robot-state observing unit 21, an environmental-shape observing unit 22, an external-force and external-moment observing unit 23, a real-time walking-pattern generating unit 25, an upper-limb and lower-limb motion request input unit 24, and a whole-body joint driving unit 26.

The robot-state observing unit 21 measures the actual quantity of motion state of the robot on the basis of information from various sensors (described above) mounted at the portions of the body, and outputs the measurement result to the real-time walking-pattern generating unit 25.

The environmental-shape observing unit 22 calculates the environmental shapes, such as the inclination of the road surface and the height of steps, on the basis of information from various sensors (described above), and outputs the calculation result to the real-time walking-pattern generating unit 25.

The external-force and external-moment observing unit 23 calculates the external force and external moment externally acting on the robot, mainly on the basis of information from force sensors and acceleration sensors mounted on the robot, and reflects the calculation result in the real-time walking-pattern generating unit 25.

The upper-limb and lower-limb motion request input unit 24 inputs gait parameters concerning motion requests to the upper limbs and motion requests to the lower limbs, such as the stride, walking cycle, and turn angle, sequentially determined according to a user program, and outputs the parameters to the real-time walking-pattern generating unit 25.

The real-time walking-pattern generating unit 25 determines the motion state of the robot at the next moment which maintains a dynamic balance under the external force detected by the external-force and external-moment observing unit 23, to which a smooth transition can be made from the present motion state of the robot, and which can satisfy the kinematic constraints concerning the environmental shapes and the requests from the user program to change the motions of the upper and lower limbs, and outputs the reference values of joint angles in the whole body.

The whole-body joint driving unit 26 drives the actuator motors (described above), which define the degrees of freedom of the joints, by a servo controller (not shown) so as to realize the reference joint angles output from the real-time walking-pattern generating unit 25.

Figure 3:
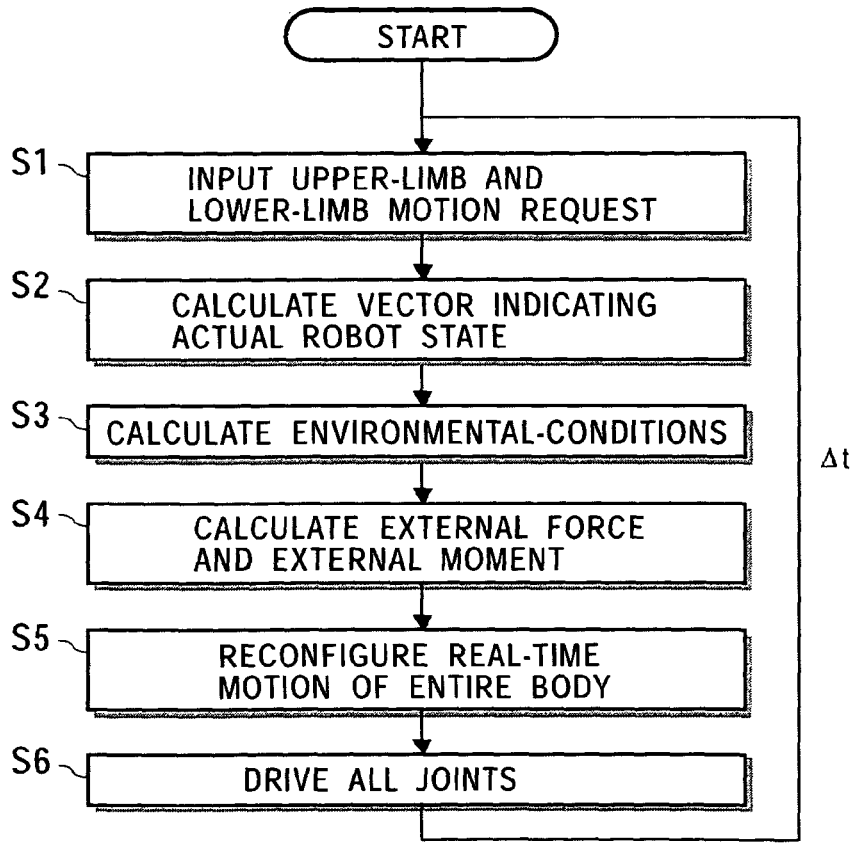
FIG. 3 is a flowchart showing the flow of processing in the locomotion control system shown in FIG. 2.

FIG. 3 is a flowchart showing the flow of processing in the locomotion control system shown in FIG. 2. The locomotion control system operates in a control cycle of, for example, 10 milliseconds.

In the control system, after the processing is started, motion requests to the upper and lower limbs are accepted by the upper-limb and lower-limb motion request input unit 24 in Step S1. For example, requests to the upper limbs are given as reference values of the joint angles, and requests to the lower limbs are given as gait parameters such as the stride, walking cycle, and turning angle.

Subsequently, state vectors indicating the actual motion state of the robot are calculated by the robot-state observing unit 21 on the basis of information from various sensors (Step S2).

Then, the environmental shapes, such as the irregularities and inclination of the road surface, are calculated by the environmental-shape observing unit 22 on the basis of information from various sensors (Step S3).

Next, external forces and external moments applied to the parts of the robot are measured on the basis of the values from the force sensors and the like by the external-force and external-moment observing unit 23 (Step S4).

Then, the motion of the entire robot is reconfigured by the real-time walking-pattern generating unit 25 so as to maintain a dynamic balance while reflecting the present state of the robot, the environmental shapes, the applied external force, and the motion change requests from the user (Step S5).

Finally, the actuator motors that define the degrees of freedom of the joints are driven by the servo controller in the whole-body joint driving unit 26 (Step S6).

The above processing is generally performed in one cycle of the system. An operation of returning to Step S1 after the completion of the processing is performed in each control cycle $\Delta t$.

The locomotion control system of this embodiment is characterized in having a real-time general-motion reconfiguring function that immediately meets the motion change request from the user program while maintaining the dynamic balance, and in reflecting information about the real world, such as the actual present state of the robot, actual environmental shapes, and external force, in that function.

That is, in this system, both the walking-pattern generating calculation and the stabilizing calculation can be made in one operation of real-time general-motion reconfiguring calculation by inputting the actual state of the robot, actual environmental shapes, and external force as boundary values and constraint conditions in the real-time general-motion reconfiguring calculation, without separately performing a stabilizing calculation for adapting to unknown environments.

Since the calculation for controlling the stabilization of the walking of the robot is thereby saved, it is possible to construct a high-performance general-motion control system having a function of flexibly reflecting the motion requests and robustness, even in an embedded CPU having limited calculation resources.

In general, when different dynamic models are used for the generation of the walking pattern and various stabilizing operations, it is impossible to deny a probability that an unexpected interference will occur between the dynamic models and will reduce the walking performance. In contrast, in the locomotion control system of this embodiment, since a dynamic calculation is consistently performed in a single calculating operation for generating the walking pattern, such an unexpected interference is rarely caused between various algorithms, and high walking performance can be obtained.

A description will be given below of an example of a configuration of the real-time walking-pattern (locomotion) generating unit 25 that carries out the basic computation.

FIG. 4 schematically shows the internal configuration of the real-time walking-pattern generating unit 25. As shown in the figure, the real-time walking-pattern generating unit 25 includes a sole position and orientation trajectory generating unit 41, a ZMP-equation solving unit 42, a mass-point distribution adjusting unit 43, a joint-angle calculating unit 44, and a present-state determining unit 45. The reference upper-limb trajectory and the gait parameters from the upper-limb and lower-limb motion request input unit 24, the environmental shapes from the environmental-shape observing unit 22, the external force and external moment from the external-force and external-moment observing unit 23, and the present actual state from the robot-state observing unit 21 are input to the real-time walking-pattern generating unit 25.

Gait parameters, such as the stride, walking cycle, turning angle, and lifting height of the leg, concerning the requested motion of the lower limbs, and environmental shapes, such as the height and inclination of the road surface, obtained from the environmental-shape observing unit 22 are input to the sole position and orientation trajectory generating unit 41. Based on the input values, the sole position and orientation trajectory generating unit 41 calculates the position and orientation trajectories of the right and left soles between the previous landing state and a subsequent state several steps ahead.

FIG. 5 shows the position and orientation trajectories of the soles. As shown in the figure, for example, the positions are expressed by the coordinate positions (x, y, and z), and the orientations are expressed by the Euler angles ($\alpha$, $\beta$, and $\gamma$). The trajectories of the right and left soles are formed by generating a time sequence corresponding to each of the gait parameters, for example, by polynomial interpolation so as to match the gait parameters and the environmental shapes. For example, as to the position and orientation trajectory of the left sole, when it is assumed that the present position and orientation of the left sole are designated by $(x_L, Y_L, Z_L, \alpha_L, \beta_L, \gamma_L)$ and the previous position and orientation of the left sole are designated as $(x_{L1}, Y_{L1}, Z_{L1}, \alpha_{L1}, \beta_{L1}, \gamma_{L1})$, the next landing position and orientation $(x_{L2}, Y_{L2}, Z_{L2}, \alpha_{L2}, \beta_{L2}, \gamma_{L2})$ are determined by the gait parameters such as the stride, walking cycle, and turning angle, and the position and orientation trajectory of the left sole therebetween is formed by interpolation expressions corresponding to the positions and the orientations as follows:

$$x_L = x_L(t; x_{L1}, x_{L2})$$

$$y_L = y_L(t; y_{L1}, y_{L2})$$

$$z_L = z_L(t; z_{L1}, z_{L2})$$

$$\alpha_L = \alpha_L(t; \alpha_{L1}, \alpha_{L2})$$

$$\beta_L = \beta_L(t; \beta_{L1}, \beta_{L2})$$

$$\gamma_L = \gamma_L(t; \gamma_{L1}, \gamma_{L2})$$

As the interpolation expressions, for example, 5th-order polynomial expressions may be used. The sole positions and orientations at the second and subsequent steps are similarly formed by interpolation expressions on the assumption that the same walking and environmental conditions as those for the first step are continued.

On the basis of the sole position and orientation trajectory generated by the sole position and orientation trajectory generating unit 41, the gait parameters, the present state of the robot, and the state of application of external force, the ZMP-equation solving unit 42 calculates robot state vectors after a period $\Delta t$ that satisfy these conditions while maintaining a dynamic balance. A description will be given below of a simple case in which the state vectors are defined by the position and speed of the center of gravity in the ZMP-equation solving unit 42.

The mass of the robot is designated by m, the position of the center of gravity in the inertial coordinate system is designated as $x=(x, y, z)^T$, and a force and a moment externally applied to the robot are designated, respectively, as $f=(f_x, f_y, f_z)^T$ and $n=(n_x, n_y, n_z)^T$. An arbitrary point $p=(p_x, p_y, p_z)^T$ is given in the inertial coordinate system, and a moment generated around p is designated as M. The gravitational acceleration vector is designated as $-g=(0, 0, -g)^T$.

Under the equilibrium condition of the moment about the point p, $$M = n + (x-p) \times f \qquad \text{(Expression 1).}$$

According to the equation of motion of the center of gravity, $$m\ddot{x} = f - mg \qquad \text{(Expression 2).}$$

When the force f externally applied to the robot is eliminated by using Expression 1 and Expression 2 above, $$M = (x-p) \times m(\ddot{x}+g) + n \qquad \text{(Expression 3).}$$

Since the horizontal moment is 0 when the point p is set at the ZMP, $$\begin{bmatrix} 0 \\ 0 \\ * \end{bmatrix} = (x-p) \times m(\ddot{x}+g) + n. \qquad \text{(Expression 4)}$$

By multiplying the first and second elements in Expression 4 above, the following ZMP equations concerning the motion of the center of gravity of the robot can be obtained:

$$(z-p_z)\ddot{x} - (x-p_x)(\ddot{z}+g) = -n_y$$

$$(z-p_z)\ddot{y} - (y-p_y)(\ddot{z}+g) = n_x \qquad \text{(Expression 5)}$$

In this way, the external moment n appears as a force term in the ZMP equations. Obtaining a systematic motion that satisfies Expression 5 above on the constraint condition that the point p lies in the landing polygon of the robot corresponds to the generation of a physically practicable walking pattern.

While Expression 5 is expressed in a simple form, it is a variable coefficient differential equation with respect to x and y. It is not easy to find an analytic solution. In this embodiment, it is assumed that the following approximations are made in a relatively short period T:

(Assumption 1) The ZMP trajectory does not have any acceleration.

(Assumption 2) The height of the center of gravity is fixed.

(Assumption 3) The external moment is fixed.

Hence, Expression 5 can be rewritten into the following simple ordinary differential equation:

$$m(Z\ddot{X}-gX) = -n_y = \text{const} \quad \text{(Expression 6)}$$

Herein, $$X = x - p_x \quad \text{(Expression 7)}$$

$$Z = z - p_z = \text{const} \quad \text{(Expression 8)}$$

and only an x-component is shown. A general solution to Expression 6 is as follows:

$$x = p_x + C_1\exp(\lambda t) + C_2\exp(-\lambda t) + \frac{n_y}{mg} \quad \text{(Expression 9)}$$

$$\dot{x} = \dot{p}_x + \lambda\{C_1\exp(\lambda t) - C_2\exp(-\lambda t)\}$$

Herein, $\lambda$ is an eigenvalue, and is given by the following equation:

$$\lambda = \sqrt{g/Z} \quad \text{(Expression 10)}$$

Boundary values of Expression 9 are calculated as follows:

$$x(0) = p_x(0) + C_1 + C_2 + \frac{n_y}{mg} \quad \text{(Expression 11)}$$

$$\dot{x}(0) = \dot{p}_x + \lambda(C_1 - C_2)$$

$$x(T) = p_x(T) + C_1\exp(\lambda T) + C_2\exp(-\lambda T) + \frac{n_y}{mg}$$

$$\dot{x}(T) = \dot{p}_x(T) + \lambda\{C_1\exp(\lambda T) - C_2\exp(-\lambda T)\}$$

The ZMP equation is a nonlinear equation. Therefore, a heavy calculation load is imposed to solve the equation, and the calculation time is long. Since the locomotion control system of this embodiment aims to control the walking of the actual robot in real time, real-time processability is ensured by making linear approximation in each of the divided periods.

Figure 6:
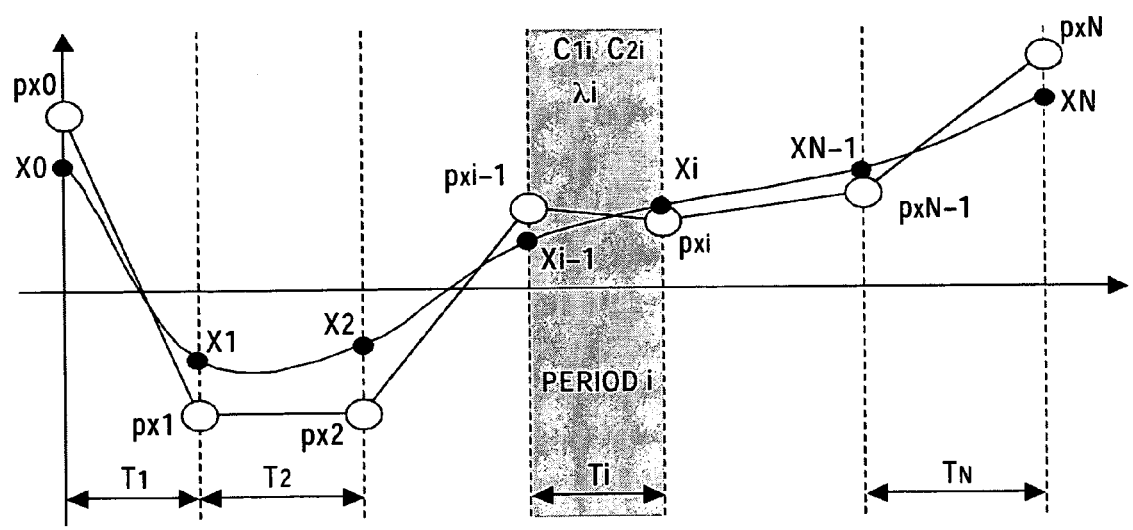
FIG. 6 is a view of a walking model in which N-number of short periods that satisfy assumptions Assumption 1 to Assumption 3 are connected.

In general walking, a model may be made in which a plurality of short periods are connected to satisfy Assumption 1 to Assumption 3 described above. FIG. 6 shows a walking model in which N-number of short periods that satisfy the assumption conditions Assumption 1 to Assumption 3 are connected. In the following description, for example, for easy handling, the short periods are separated on the boundaries between one-leg support phases and double-leg support phases. When it is assumed that the time width of the i-th period is designated as $T_i$, indeterminate coefficients are designated as $C_{1i}$ and $C_{2i}$, an eigenvalue is designated as $\lambda_i$, the ZMP position at the end of the period i is designated as $p_{xi}$, and the position of the center of gravity is designated as $x_i$, the boundary conditions in Expression 11 above are expressed in the general periods as follows:

$$x_{i-1} = p_{xI-1} + C_{1i} + C_{2i} + \frac{n_y}{mg} \quad \text{(Expression 12)}$$

$$\dot{x}_{i-1} = \dot{p}_{xi-1} + \lambda_i(C_{1i} - C_{2i})$$

-continued $$x_i = p_{xi} + C_{1i}\exp(\lambda_i T_i) + C_{2i}\exp(-\lambda_i T_i) + \frac{n_y}{mg}$$

$$\dot{x}_i = \dot{p}_{xi} + \lambda_i\{C_{1i}\exp(\lambda_i T_i) - C_{2i}\exp(-\lambda_i T_i)\}$$

The external moment $n_y$ is fixed in all the periods. The following expressions are derived on the boundaries between the short periods (i=2, . . . , N) under the condition of continuity of the position and speed of the center of gravity between the adjoining periods:

$$C_{1i} + C_{2i} = C_{1i-1}\exp(\lambda_{i-1}T_{i-1}) + \quad \text{(Expression 13)}$$
$$C_{2i-1}\exp(-\lambda_{i-1}T_{i-1})$$

$$\frac{p_{xi} - p_{xi-1}}{T_i} + \lambda_i(C_{1i} - C_{2i}) = \frac{p_{xi-1} - p_{xi-2}}{T_{i-1}} + \quad \text{(Expression 14)}$$
$$\lambda_{i-1}\{C_{1i-1}\exp(\lambda_{i-1}T_{i-1}) - C_{2i-1}\exp(-\lambda_{i-1}T_{i-1})\}$$

The following settings are made to realize the position and speed of the center of gravity by using the start condition of Period 1 as the start condition of the entire walking period:

$$C_{1_1} + C_{2_1} + p_{x0} + \frac{n_y}{mg} = \bar{x}_0 \quad \text{(Expression 15)}$$

$$\frac{p_{x1} - p_{x0}}{T_1} + \lambda_1(C_{1_1} - C_{2_1}) = \dot{\bar{x}}_0 \quad \text{(Expression 16)}$$

Similarly, the following settings are made to realize the position and speed of the center of gravity by using the end condition of Period N as the end condition of the entire walking period:

$$p_{x_N} + C_{1_N}\exp(\lambda_{iN}T_N) + C_{2_N}\exp(-\lambda_N T_N) + \frac{n_y}{mg} = \bar{x}_N \quad \text{(Expression 17)}$$

$$\frac{p_{x_N} - p_{x_{N-1}}}{T_N} + \quad \text{(Expression 18)}$$
$$\lambda_N\{C_{1_N}\exp(\lambda_N T_N) - C_{2_N}\exp(-\lambda_N T_N)\} = \dot{\bar{x}}_N$$

The present-state vectors (the position and speed of the center of gravity in this embodiment) output from the present-state determining unit 45 are substituted for the position and speed of the center of gravity in the start condition. The solution to the ZMP equation is thereby restrained so that the position and speed continue to the present state.

As the position of the center of gravity in the end condition, for example, the center positions of both the soles are set based on the positions of both the soles at the end of the walking period obtained by the sole position and orientation trajectory generating unit 41. The speed in the end condition is set, for example, 0 is substituted, on the assumption that the center of gravity is fixed at the position of the center of gravity. The solution to the ZMP equation is thereby restrained so that the center of gravity is placed right on the centers of the both soles at the end of the walking period after several steps are made.

When generating the real-time walking pattern, a walking pattern is regenerated in each control cycle, and the motion state in the next control cycle is determined. Therefore, even when the end condition at an end time sufficiently apart from the present time is thus approximately given, a practically precise solution can be obtained.

Expression 13 to Expression 18 above provide 2N+2 constraint conditions. Variables other than the indeterminate coefficients $C_{1i}$ and $C_{2i}$ (i=1, ..., N) may be set by many methods. In this embodiment, $p_{xi}$ (i=1, ..., N) is added as a variable.

In this case, since the number of variables is 3N and is excessive, the variables are treated as a problem of optimization. For example, these variables can be uniquely determined by being treated as a quadratic programming problem with an equality constraint condition expressed by the following expression so as to minimize the difference between the center of the stable area (that is, the center of gravity in the landing polygon) and the ZMP position Pxi (i=1, ..., N). The position $\bar{p}_{xi}$ (i=1, ..., N) of the center of gravity in the landing polygon can be obtained on the basis of the sole position trajectory generated by the sole position and orientation trajectory generating unit 41:

$$\min \Sigma (p_{xi} - \bar{p}_{xi})^2 \qquad \text{(Expression 19)}$$

Alternatively, Expression 13 to Expression 18 may be solved as 2N+2-element simultaneous equations while the ZMP position is fixed at the position of the center of gravity of the landing polygon in the periods other than specific periods j and k $\in$ [1, N], and only $p_{xj}$ and $p_{xk}$ are set as variables.

From the above, the intermediate motion state can be calculated by using Expression 9 so as to make a smooth transition to the present motion state and to achieve a designated motion state at a desired time under the condition that the external moment acts. By using this expression, the state of the robot to be used in the next control cycle (a time $\Delta t$ after) can be calculated as follows:

$$x(\Delta t) = p_{x0} + C_{1_0} \exp(\lambda_0 \Delta t) + C_{2_0} \exp(-\lambda_0 \Delta t) + \frac{n_y}{mg} \qquad \text{(Expression 20)}$$

$$\dot{x}(\Delta t) = \dot{p}_{x0} + \lambda_0 \{C_{1_0} \exp(\lambda_0 \Delta t) + C_{2_0} \exp(-\lambda_0 \Delta t)\}$$

The mass-point distribution adjusting unit 43 adjusts the distribution of the mass points in the whole body so as to realize the next-moment state vectors obtained by the above ZMP-equation solving unit 42 and to achieve the reference upper-limb trajectories (e.g., the joint angle trajectories) designated by the user program and the sole trajectories (given by the gait parameters).

As a basic example, in a state in which the sole positions and orientations and the joint angles in the upper body are fixed at the values required by the user program, the position $(x_B, y_B, z_B)$ of the body is controlled, and the mass-point distribution in the whole body is adjusted so as to achieve the position of the center of gravity obtained by the ZMP-equation solving unit 42. On such a geometrical constraint condition, the speed of the body and the speed of the center of gravity have the following relationship:

$$\dot{x} = J_B \dot{x}_B \qquad \text{(Expression 21)}$$

where the Jacobian is designated as $J_b$.

The Jacobian depends on the present joint angles in the legs. When there is a deviation $dx = x_{k+1} - x_k$ between the present position $x_k$ of the center of gravity of the robot and the next-moment position $x_{k+1}$ of the center of gravity obtained by the ZMP-equation solving unit 42, the control amount $dx_B$ of the position of the body can be approximately given by the following expression:

$$dx_B = J_B^T dx \qquad \text{(Expression 22)}$$

The reference upper-limb joint angles input from the user program are also reflected in the calculation of the center of gravity. From the above, when the present position of the body is designated as $x_{BK}$, the position $x_{BK+1}$ of the body after the mass-point distribution is adjusted to realize the state obtained by the ZMP-equation solving unit 42 can be given by the following expression:

$$x_{B_{k+1}} = x_{B_k} + J_B^T dx \qquad \text{(Expression 23)}$$

In a case in which the deviation between the position of the center of gravity obtained by Expression 23 and the next-moment position of the center of gravity obtained by the ZMP-equation solving unit 42 remains large, a convergent calculation may be carried out by repeatedly using Expression 23 so that the deviation is sufficiently reduced.

The joint-angle calculating unit 44 determines the joint angles in the legs so as to realize the next-moment basic position obtained by the mass-point distribution adjusting unit 43 and the next-moment sole positions and orientations obtained by the sole position and orientation trajectory generating unit 41. For example, the determination may be made by a known inverse kinematics calculation after the relative positions and orientations are found.

The leg joint angles obtained by the inverse kinematics calculation and the reference upper-limb joint angles given by the user program are output together as the next-moment reference joint angles in the whole body. The reference joint angles in the whole body are used as the reference joint angles in the whole-body joint driving unit 26.

The present-state determining unit 45 determines and updates present-state vectors to be used as a start condition of the ZMP-equation solving unit in the next control cycle, on the basis of the present-state vectors of the robot calculated based on the values from various sensors and the state vectors calculated by the ZMP-equation solving unit 42 and used as the reference values in the previous control cycle. That is, since the present-state vectors of the robot calculated based on the sensor values are generally different from the state vectors calculated by the ZMP-equation solving unit 42, computation is performed to adjust the difference.

When there is no need to reflect the actual state of the robot, the output of the ZMP-equation solving unit 42 is simply output as the present-state vectors. This corresponds to a case in which a walking pattern output as a result of the real-time locomotion generation is carried out under open loop control. In contrast, when it is necessary to reflect the actual state of the robot, the present-state vectors of the robot calculated based on the sensor values are output as present-state vectors. In a case in which the present-state vectors of the robot calculated based on the sensor values are given as a difference from an ideal value, the sum of the output from the ZMP-equation solving unit 42 and the difference of the present state vectors may be output as present-state vectors.

Figure 7:
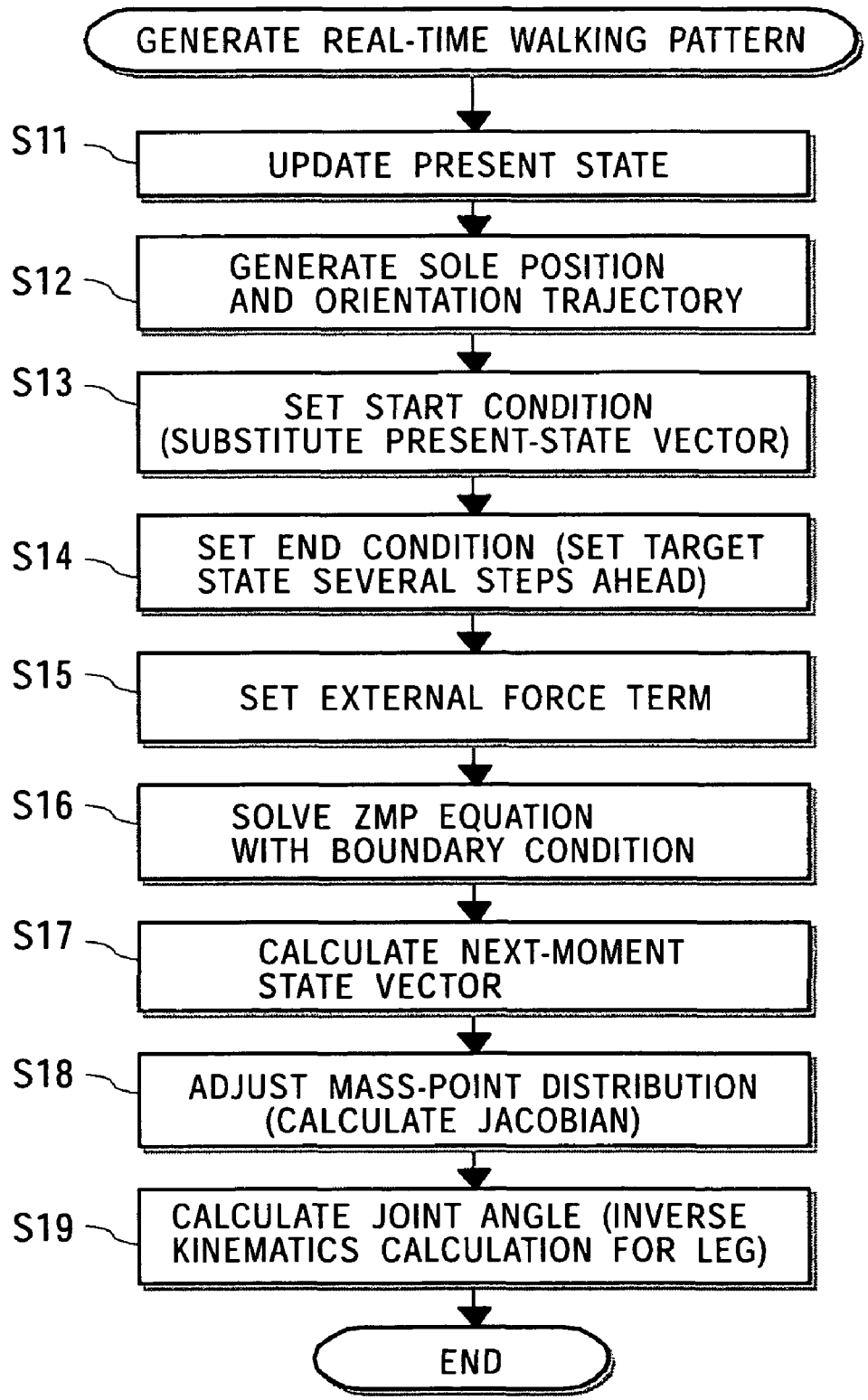
FIG. 7 is a flowchart showing the flow of processing in the real-time walking pattern generating unit 25.

The internal configuration of the real-time walking-pattern generating unit 25 has been described above. FIG. 7 is a flowchart showing the flow of processing in the real-time walking-pattern generating unit 25.

First, present-state vectors that are to be set as the initial condition of the ZMP equation in the present control cycle are calculated on the basis of the state vectors calculated by the ZMP-equation solving unit 42 in the previous control cycle and the present-state vectors of the robot calculated based on the sensor values (Step S11).

Subsequently, sole position and orientation trajectories several steps ahead are generated in accordance with the present positions and orientations of both the feet, and the gait parameters, such as the stride, walking cycle, and turning angle, requested by the user program (Step S12).

The present-state vectors obtained in Step S11 are set as a start constraint condition of the ZMP equation (Step S13). Similarly, an end constraint condition of the ZMP equation is set on the basis of the sole positions and orientations several steps ahead obtained in Step S12 (Step S14).

The result made by the external-force and external-moment observing unit 23 is set to an external-force term in the ZMP equation (Step S15). In Step S16, a boundary value problem of the ZMP equation is solved to satisfy these conditions.

In this embodiment, the state of the real world can be reflected in the solution of the ZMP equation, for example, the present-state vectors of the actual robot including the sensor values can be set as the initial condition, and the actually measured external force is reflected in the force term. The state vectors (target state vectors) of the robot in the next control cycle (a time $\Delta t$ after) are calculated from a solution to the ZMP equation thus obtained (Step S17). These state vectors provide values that permit a smooth transition to the present motion state, that reflect the gait parameters required by the user, and that maintain a dynamic balance under the condition that an external force acts.

Next, the distribution of the mass points in the whole body for realizing the state vectors (target state vectors) is found (Step S18), the result is converted into reference joint angles (Step S19), and a calculation for generating a real-time walking pattern in one control cycle is then completed.

By performing this processing routine in each control cycle, it is possible to immediately respond to sudden changes in the locomotion and the actual motion state.

In the robot locomotion control method according to this embodiment, the state of the real environment is reflected in the real-time walking-pattern generating unit 25. Therefore, there is no need to add a new dynamic model, particularly for the adaptive control system, in order to realize the walking performance adapted to unknown environmental conditions. That is, after the general-purpose real-time walking-pattern generating unit 25 is constructed, it is only necessary to make the robot-state observing unit 21, the environmental-shape observing unit 22, and the external-force and external-moment observing unit 23 for adaptive control functions.

Descriptions will be given below of several examples in which the robot-state observing unit 21, the environmental-shape observing unit 22, and the external-force and external-moment observing unit 23.

As a first example for the addition of an adaptive control function, the robot-state observing unit 21 is provided. The robot-state observing unit 21 measures the physical amount corresponding to the state vectors in the real-time walking-pattern generating unit 25 according to values from various sensors. In this embodiment, the position and speed of the center of gravity corresponding to the above-described state vectors in the real-time walking-pattern generating unit 25 are measured.

Figure 8:
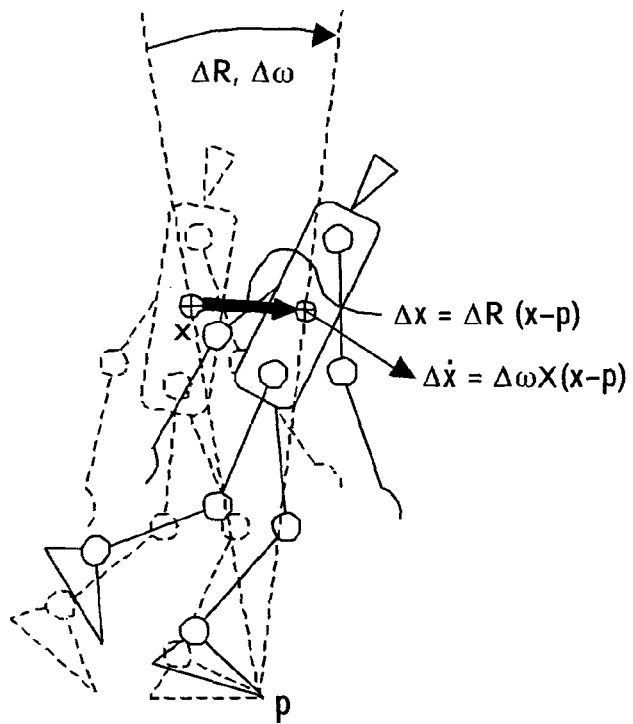
FIG. 8 is a view showing a state in which the position of the center of gravity deviates due to the turning motion of the whole body of the robot.

FIG. 8 shows a state in which a deviation of the position of the center of gravity is caused by the turning of the entire robot body. When it is assumed that the deviation $\Delta x$ of the position of the center of gravity is mainly caused by the turning of the entire robot around the ZMP center position, as shown in the figure, it can be approximately given by the following expression:

$$\Delta x = \Delta R(x-p) \quad \text{(Expression 24)}$$

Herein, $\Delta R$ represents the matrix indicating the inclination deviation obtained by the acceleration sensors and the gyroscopes mounted on the body. The deviation of the speed of the center of gravity can be approximately given by the following expression:

$$\Delta \dot{x} = \Delta \omega \times (x-p) \quad \text{(Expression 25)}$$

Herein, $\Delta \omega$ represents the deviation vector obtained of angular velocity obtained from the gyroscopes mounted on the body. By being input to the present-state determining unit 45, the deviation of the position of the center of gravity and the deviation of the speed of the center of gravity are reflected as start conditions for the next-moment locomotion calculation, so that the walking pattern is reconfigured in consideration of the deviation of the trajectory of the center of gravity.

Figure 9:
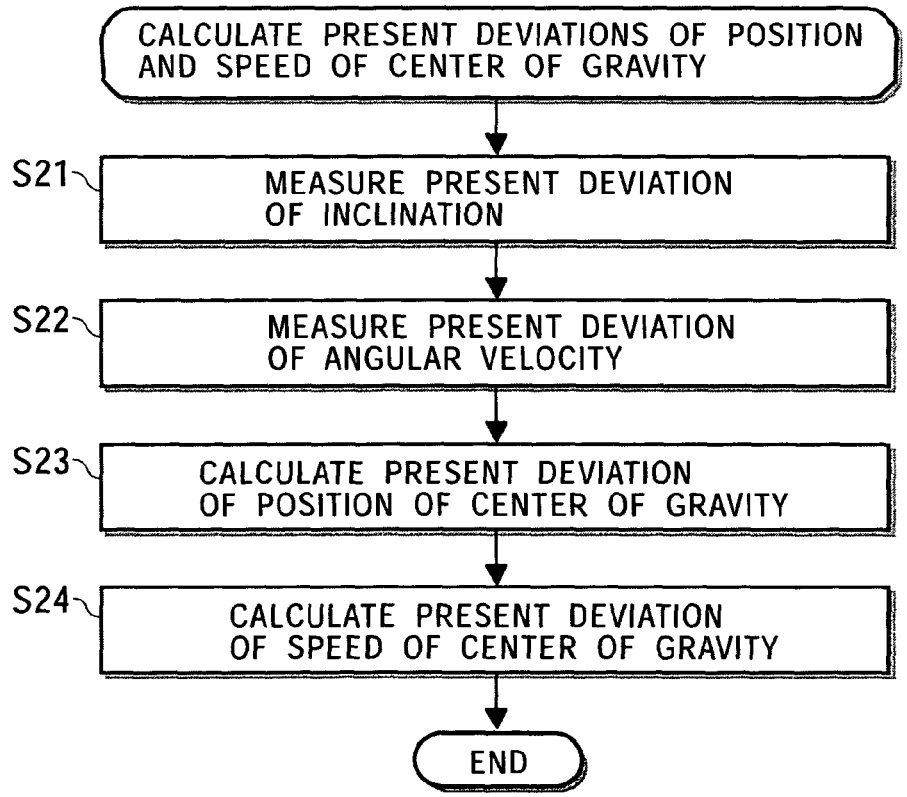
FIG. 9 is a flowchart showing the flow of processing in a robot-state observing unit 21 for measuring the position and speed of the center of gravity.

FIG. 9 is a flowchart showing the procedure for calculating the deviations of the position and speed of the center of gravity in the robot-state observing unit 21 that measures the position and speed of the center of gravity.

First, an actual inclination R of the body is measured on the basis of a value from the acceleration sensor A1 or the gyroscope G1 mounted on the body, and an inclination deviation $\Delta R = R_0^T R$ is calculated as a deviation from a planned inclination $R_0$ of the body calculated by the real-time walking-pattern generating unit 25 (Step S21).

Similarly, an actual angular velocity $\omega$ of the robot is measured on the basis of a value from the gyroscope mounted on the body, and a deviation $\Delta \omega = \omega - \omega_0$ from a planned angular velocity $\omega_0$ of the body calculated by the real-time walking-pattern generating unit 25 is calculated (Step S22).

Subsequently, a deviation of the position of the center of gravity is calculated by using Expression 24 above (Step S23), a deviation of the speed of the center of gravity is calculated by using Expression 25 (Step S24), and this processing is then completed. The deviation of the position of the center of gravity and the deviation of the speed of the center of gravity thus obtained are input to the present-state determining unit 45.

By thus constructing the robot-state observing unit 21, even when the robot loses its balance and the trajectory of the center of gravity deflects from the planned state, a calculation for recovering the state is performed as a part of the calculation for generating the real-time walking pattern. Therefore, a function of flexibly responding to a locomotion change request and a function of adaptation to unknown environments can be achieved with less calculating operations.

While the acceleration sensors or the gyroscope mounted on the body is simply used as the means for measuring the state vectors in this embodiment, the scope of the present invention is not limited thereto. For example, measurement may be made by cooperatively using force sensors, acceleration sensors (e.g., A2 and A3 in FIG. 1), and gyroscopes (e.g., G2 and G3 in FIG. 1) provided at the soles, or acceleration sensors, gyroscopes, and force sensors distributed over the whole body.

A description will now be given of a second example in which the environmental-shape measuring unit 22 is provided for the addition of an adaptive control function, besides the robot-state observing unit 21.

The environmental-shape observing unit 22 calculates the environmental shapes, such as the road irregularities and road inclination, on the basis of values from various sensors, and inputs the environmental shapes to the real-time walking-pattern generating unit 25. In this embodiment, an example in which the road surface shape is grasped based on the values from the sole force sensors will be particularly described below.

Figure 10:
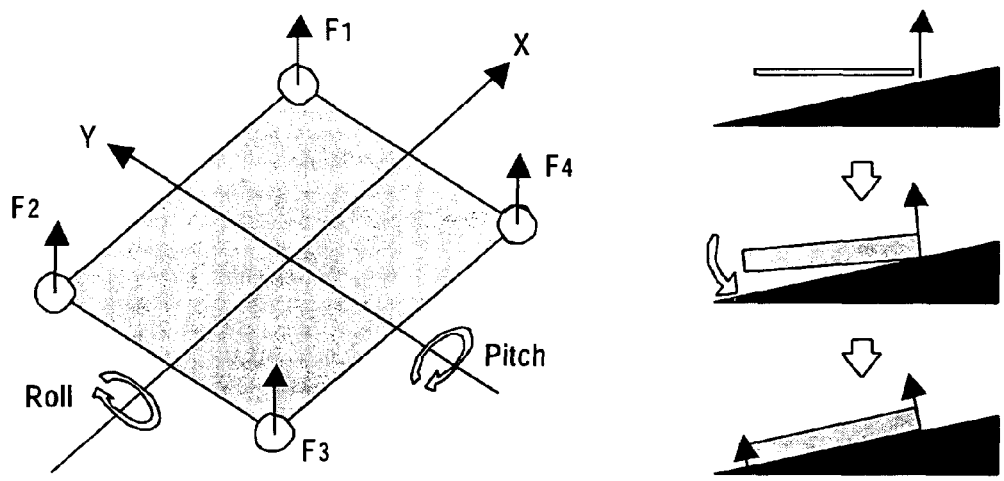
FIG. 10 is a view showing a method for measuring the road inclination.

FIG. 10 illustrates a method for calculating the road inclination. Force sensors for measuring the force in one direction perpendicular to the sole surface are mounted at the four corners of each of the right and left soles of the robot of this embodiment, as described above, and outputs therefrom are designated as $F_i$ (i=1, ..., 4), as shown in the left part of FIG. 10.

During a swing phase in which the sole is not in contact with the road surface, a load of 0 is output from the sensors, and information about the road surface shape is not obtained. In such a case, processing is performed to slowing return an estimated rolling inclination angle $\alpha_F$ and an estimated pitching inclination angle $\beta_F$ of the road to 0. Since positive values $F_i$ (i=1, ..., 4) are output the moment the sole touches the road, the road inclination is estimated from the values.

When such a calculated road inclination is input to the real-time walking-pattern generating unit 25, it is reflected in the trajectory of the sole, and the sole is driven to follow the inclination. Accordingly, the sole is driven to follow the road surface, as shown in the right part of FIG. 10, by updating the estimated value in each control cycle.

When the sole follows the road surface, the sum of the outputs from the force sensors provided at all the sides of the rectangular sole is a non-zero load, as shown in the lower right of FIG. 10. For example, it may be determined that the sole follows the road surface in the rolling direction when the sum $F_L = F_1 + F_2$ and the sum $F_R = F_3 + F_4$ are non-zero loads. Similarly, it may be determined that the sole follows the road surface in the pitching direction when the sum $F_F = F_1 + F_4$ and the sum $F_R = F_2 + F_3$ are non-zero loads.

In order to thus drive the sole, the estimated road inclination is increased or decreased by the values corresponding to the products of the load differences between the front and rear sides and between the right and left sides, and a fixed gain, as shown in the following expressions:

$$\alpha_F = \alpha_F + K_{roll} \times (F_L - F_R)$$

$$\beta_F = \beta_F + K_{pitch} \times (F_B - F_F) \quad \text{(Expression 26)}$$

In this embodiment, the road inclination is estimated when one of $F_L$ and $F_R$ in the rolling direction, and one of $F_F$ and $F_B$ in the pitching direction takes a small value. That is, the estimated road inclination is updated, as needed, until the sole follows the road surface, and the sole is driven to follow the road surface. In contrast, in a state in which the sole has followed the road surface, the estimated road inclination is not updated imprudently. From the above, the road inclination can be properly measured with the sole force sensors.

Similarly, the road surface height can be measured with the sole force sensors. Hereinafter, the estimated road surface height is designated as $z_F$, and the total vertical reactive force detected by the sensors mounted at a target sole is designated as F.

In a case in which a vertical reactive force is detected, in spite of a planned swing phase, it can be determined that the sole touches the road surface higher than or equal to the present estimated height. Therefore, the estimated road height is gradually increased to adjust the sole trajectory upward, as follows:

$$z_F = z_F + K_Z F, \quad F = \sum_{i=1}^{i=4} F_i \quad \text{(Expression 27)}$$

In a case in which a vertical reactive force is not detected, in spite of a planned leg-support phase, it can be determined that the height of the road surface is lower than or equal to the present estimated height. Therefore, the road surface height is gradually decreased to adjust the sole trajectory downward, as follows:

$$z_F = z_F - K_Z \delta z \quad \text{(Expression 28)}$$

Herein, $\delta z$ is a small variable. During the swing phase in which the sole is not in contact with the road surface, operation for slowing recovering the estimated road surface height $Z_F$ to 0 is performed to return the sole to the planned trajectory.

Figure 11:
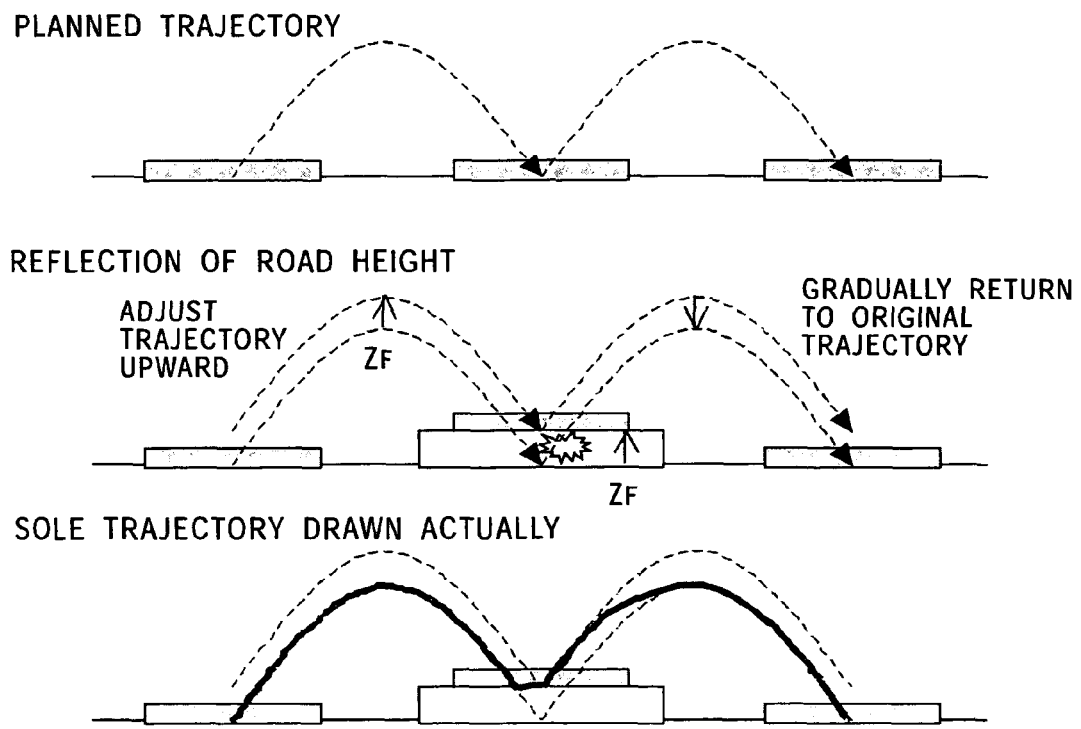
FIG. 11 is a view showing the trajectory of the sole made to gradually return to a planned trajectory during a swing phase after being restrained with respect to an unknown road surface height the moment the sole touches the road.

By the above processing, as shown in FIG. 11, after the sole trajectory is restrained in accordance with an unknown road height the moment the sole touches the road surface, it is gradually returned to the planned trajectory during the swing phase.

As described above, the estimated road inclinations $\alpha_F$ and $\beta_F$ and the estimated road height $Z_F$ are measured for each of the right and left soles, and are reflected, in each control cycle, in the positions and orientations of the soles achieved when the soles leave and touch the road surface, in the sole-trajectory generating unit of the real-time walking-pattern generating unit. Consequently, the robot can maintain and continue a stable walking while maintaining a dynamic balance and reconfiguring the sole trajectory to conform to the unknown road surface shape. In particular, a robust walking performance can be achieved by also using the robot-state observing unit 21.

Figure 12:
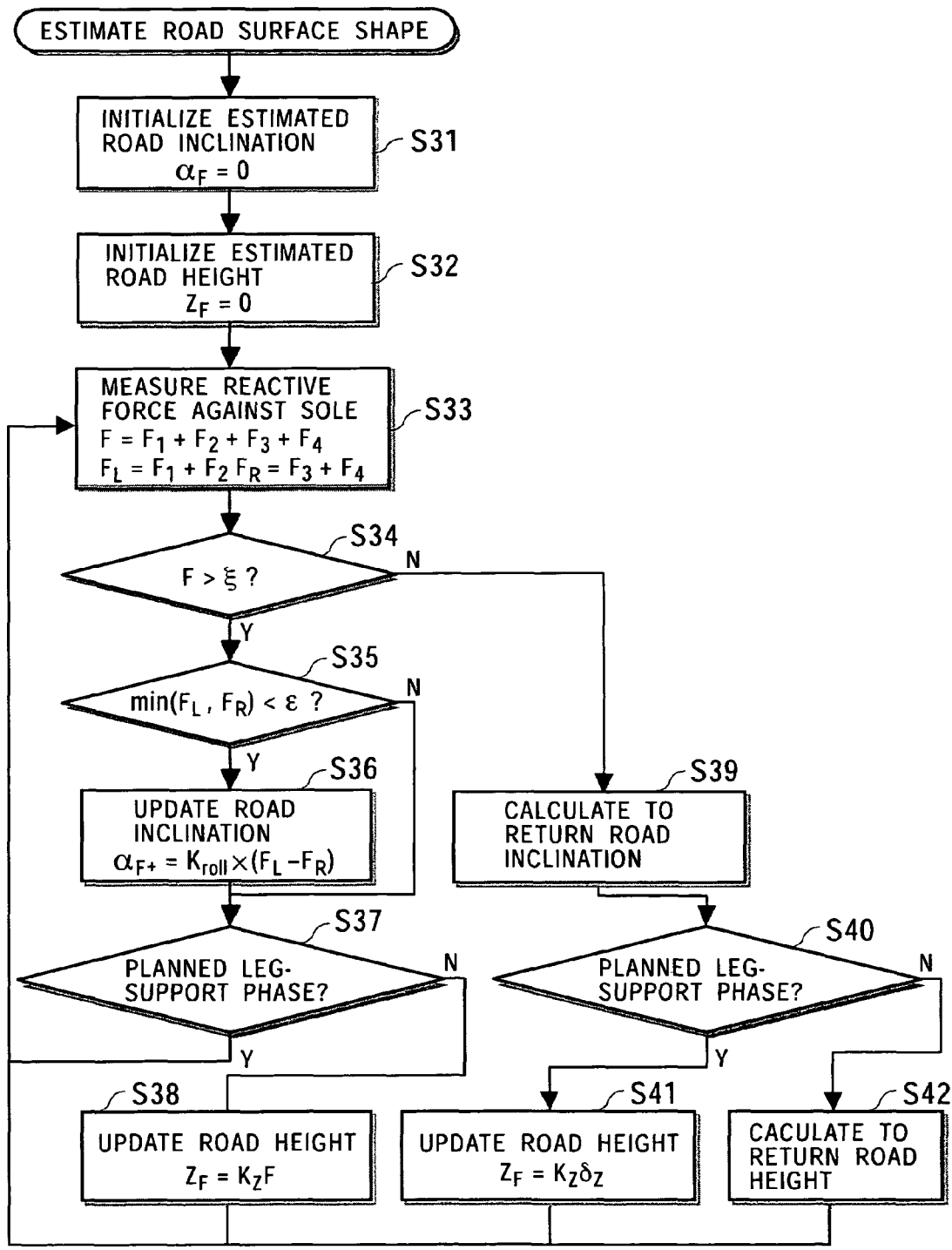
FIG. 12 is a flowchart showing the procedure for estimating the inclination and height of the road surface.

FIG. 12 is a flowchart showing the procedure for estimating the road inclination and the road surface height. For the sake of simplicity, processing for only one leg will be described. As for the road inclination, processing only in the rolling direction will be described.

This processing is carried out in each predetermined control cycle, and the estimated road inclination and the estimated road surface height are updated. In the first time, the estimated road inclination and the estimated road surface height are initialized to planned values in Steps S31 and S32.

Subsequently, a total reactive force F and reactive forces $F_L$ and $F_R$ acting on the four sides of the sole are measured and calculated (Step S33). On the basis of the results thereof, it is determined whether the sole is in contact with the road (Step S34).

When the total reactive force F is larger than a positive threshold $\xi$, it is determined that the sole is in contact with the road surface, and Step S35 is then performed. Step 35 is performed to judge whether the sole follows the road surface. When either of $F_L$ and $F_R$ is smaller than a positive threshold $\epsilon$, it is determined that the sole does not completely follow the road surface, and Step S36 is then performed.

After the estimated road inclination is updated according Expression 26 above in Step S36 so that the solo follows the road surface, Step S37 is performed.

In contrast, when both the floor reactive forces $F_L$ and $F_R$ are larger than $\epsilon$, and it is determined that the sole completely follows the road surface, there is no need to update the estimated road inclination in Step S36, and Step S37 is then performed.

In Step S37, it is determined whether the present time is included in a phase in which the target sole functions as a support leg, in the planned walking pattern. When it is determined that the present time is included in the support leg period, it is considered that the sole touches the road, as planned, and an operation for estimating the road surface shape in one control cycle is completed. In contrast, when it is determined that the present time is included in the swing phase, it is considered that the sole touches the road surface higher than or equal to the planned value, and the estimated road height is updated according to Expression 27 above in Step S38, so that an operation for estimating the road surface shape in one control cycle is completed.

When it is determined in Step S34 that the sole is not in contact with the road surface, computation is performed in Step S39 so that the estimated road inclination gradually returns to the planned value. Subsequently, it is determined whether the present time is included in a phase in which the target sole functions as a support leg in the planned walking pattern (Step S40).

When it is determined that the present time is included in the support leg phase, it is judged that the sole cannot touch the road at a planned timing because the road surface height is lower than the planned value, and the estimated road surface height is updated according to Expression 28 above (Step S41), so that an operation for estimating the road surface shape in one control cycle is completed.

In contrast, when it is determined in Step S40 that the present time is included in the swing phase, it is considered that the a non-touch state is maintained, as planned. After computation is performed so that the estimated road surface height gradually returns to the planned value (Step S42), an operation for estimating the road surface shape in one control cycle is completed.

While the environmental shapes are estimated with the sole force sensors serving as the environmental-shape measuring means after the sole touches the road in this embodiment, they may be measured (in a non-contact manner) with ranging sensors (e.g., D1 to D8 in FIG. 1) provided at the sole during the swing phase, or may be measured using a visual function. Alternatively, these functions may be used cooperatively.

A description will now be given of a third example in which the external-force and external-moment observing unit 23 is further provided for the addition of an adaptive control function.

The external-force and external-moment observing unit 23 measures the moment acting around the point p on the floor by using a force sensor for one direction perpendicular to the sole. In particular, in a case in which the point p is placed at the ZMP, when an ideal walking state is maintained, the output external moment n is 0. Conversely, when the detected external moment is not 0, it can be considered as an unplanned external moment acting on the robot.

Figure 13:
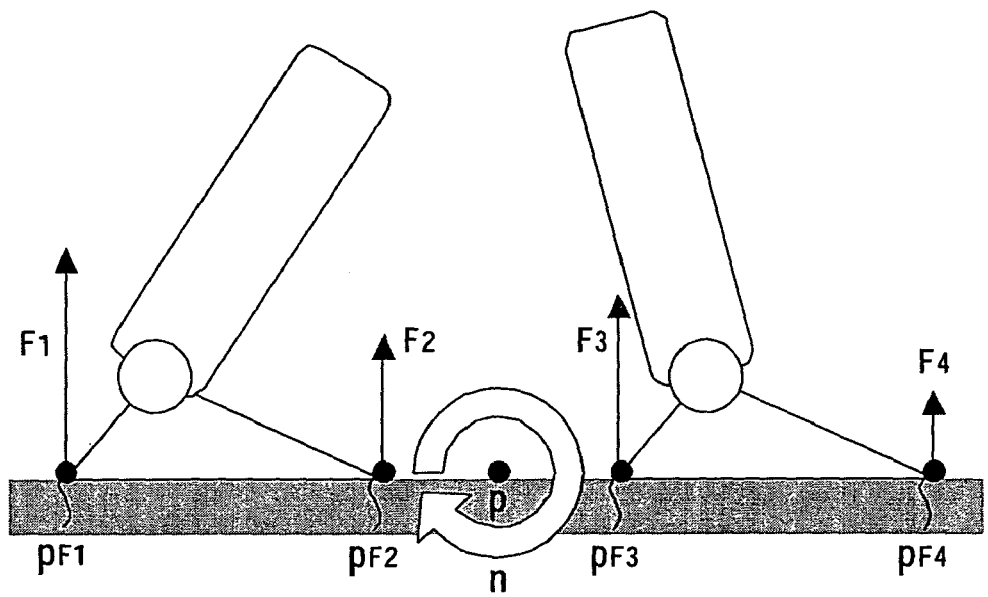
FIG. 13 is a view showing a state in which a moment acting around a point p on the floor is measured with load sensors for one direction perpendicular to the soles.

FIG. 13 shows a state in which the moment acting around the point p on the floor is measured with force sensors for one direction perpendicular to the sole. As shown in the figure, in a condition in which the sole is substantially parallel to the floor surface, and the one-axis force sensors at the sole that output a no-zero load are disposed in the same horizontal plane as the point p, the moment n acting around the point p can be approximately given by the following expression:

$$n = \sum_{i=1}^{i=8} (p_{Fi} - p) \times \begin{bmatrix} 0 \\ 0 \\ F_i \end{bmatrix} \quad \text{(Expression 29)}$$

where $F_i$ (i=1, ..., 8) represents the output from each one-axis force sensor at the sole, and $P_{Fi}$ (i=1, ..., 8) represents the position of each force sensor.

Figure 14:
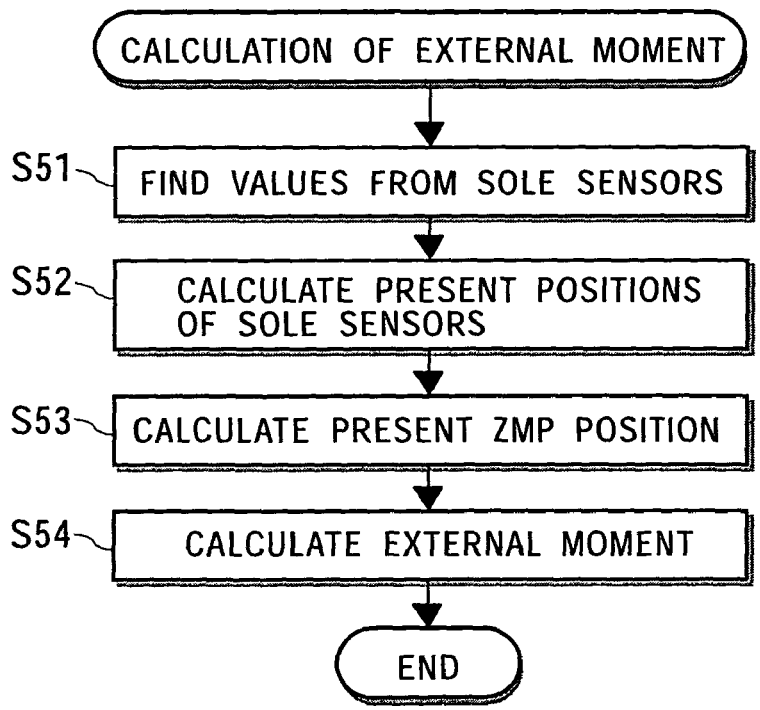
FIG. 14 is a flowchart showing the procedure for measuring the moment acting around the point p on the floor with the load sensors for one direction perpendicular to the soles.

FIG. 14 is a flowchart showing the procedure for measuring the moment acting around the point p on the floor with the one-axis force sensors for one direction perpendicular to the sole.

After the values $F_i$ (i=1, ..., 8) of the sole sensors are measured (Step S51), the present positions $P_{Fi}$ (i=1, ..., 8) of the force sensors mounted at the four ends of the soles are calculated on the basis of the present sole positions and orientations generated in the real-time walking-pattern generating unit 25 (Step S52).

The present ZMP position p is obtained by the real-time walking-pattern generating unit 25 (Step S53).

Finally, the moment about the point p is calculated using Expression 29 above (Step S54), and this processing routine is completed.

By inputting the external moment n thus estimated and calculated into the ZMP equation with a constraint term in the above-described real-time walking-pattern generating unit 25, the motion of the whole body can be reconfigured more adaptively to the external moment and the robot can more stably walk, than in the first embodiment.

By inputting information about the real world to the real-time walking-pattern generating unit 25, as described above, the joint angles in the whole body are output which immediately respond to the motion change request from the user and which enable robust walking to be continued in known and unknown environments. Finally, a desired motion state can be realized by controlling the positions of the joints with, for example, a PID controller in the whole-body joint driving unit with reference to the joint angles in the whole body.

While two-dimensional vectors $[x, dx/dt]^T$ composed of the position of the center of gravity x and the speed of the center of gravity dx/dt are used as the state vectors (quantity of state) in the above-described embodiment of the present invention, the scope of the present invention is not limited thereto. For example, two-dimensional vectors $[p, dp/dt]^T$ composed of the position p and the speed dp/dt of a specific portion near the center of gravity, such as the waist, or 2N-dimensional vectors $[p_1, p_2, ..., p_N, dp_1/dt, dp_2/dt, ..., dp_N/dt]^T$ composed of the mass-point positions $p_i$ and the speed $dp_i/dt$ (i represents the index of the mass point, and i=1, ..., N) in the whole body may be used as the state vectors.

While the ZMP equation concerning the center of gravity is used as the equation of motion in this embodiment, the scope of the present invention is not limited thereto. For example, a ZMP equation that is stated in consideration of the mass of each link, the center of gravity, and the moment of inertia, or an equation of motion, other than the ZMP equation, regarding the whole body of a general type of robot that can express general road surfaces and a non-contact state with the road state may be used.

Addenda

The present invention has been described in detail above with reference to the specific embodiment. However, it is obvious that modifications and substitutions of the embodiment can be made by those skilled in the art without departing from the scope of the present invention.

The scope of the present invention is not necessarily limited to products called "robots". That is, the present invention is similarly applicable to any mechanical apparatus that makes motions similar to those of a human being by using an electrical or magnetic effect, even when the apparatus is a product, such as a toy, belonging to a different industrial field.

In short, the present invention has been disclosed in conjunction with the examples, and the contents of the specification should not be limitatively interpreted. The scope of the present invention should be interpreted in consideration of the claims stated at the beginning.

INDUSTRIAL APPLICABILITY

The present invention can provide a superior robot apparatus that can properly generate a walking pattern in an actual apparatus and in real time, and a control method for the robot apparatus.

The present invention can further provide a superior robot apparatus that can properly control the walking while ensuring the consistency of dynamic models for generating the walking pattern and various adaptive control operations, and a control method for the robot apparatus.

The present invention can further provide a superior robot apparatus that can properly control the stabilization of the body in an embedded CPU having limited calculation resources, and a control method for the robot apparatus.

The present invention can further provide a superior robot apparatus that can enhance the walking performance by sharing a consistent dynamic model provided in consideration of the mutual interference between adaptive control functions, and a control method for the robot apparatus.

According to the present invention, the locomotion can be continuously changed at desired timings, and a flexible and diversified walking performance can be achieved by the "real-time walking-pattern generating" function for immediately reconfiguring the motion of the whole body while maintaining a dynamic balance of the body so as to satisfy the gait parameters, such as the stride, walking cycle, turning angle, and lifting height of the leg, asynchronously input from sensors and so on.

According to the present invention, the motion of the whole body is reconfigured by the real-time walking-pattern generating function so that the motions of specific portions (e.g., upper limbs) can be performed in combination at a desired timing. Therefore, the specific portions can be asynchronously and reactively driven without imposing a heavy load on the stabilization control system, and the motion pattern can be diversified.

According to the present invention, calculation for a stabilizing algorithm is integrated and united to the calculation in one real-time walking-pattern generating algorithm. Therefore, both the real-time walking-pattern generating function and the stabilizing function can be achieved with high calculation efficiency. This is advantageous in calculation in an embedded CPU having limited calculation resources, and can save the CPU resources.

According to the present invention, a dynamic calculation used in the stabilizing function is integrated into the real-time walking-pattern generating calculation, and the stabilizing function is basically added only by performing an additive input to the setting items in the real-time walking-pattern generating unit. Consequently, it is possible to save the calculations and to construct a highly expandable walking system.

According to the present invention, a dynamic calculation used in the stabilizing function is integrated into one real-time walking-pattern generating calculation made in consideration of the interference effect of various stabilizing operations. Therefore, an undesired interference is not caused between independent dynamic models, a consistent dynamic model is ensured, and a superior locomotion control function can be achieved.

The invention claimed is:

1. A robot apparatus having moving means, the robot apparatus comprising:
    state detecting means for detecting a kinematic state of the robot apparatus;
    real-time equation-of-motion solving means for finding a solution to an equation of motion with a boundary condition concerning the kinematic state of the robot apparatus;
    boundary-condition setting means for setting a current kinematic state detected by the state detecting means as a boundary condition of the equation of the motion; wherein the state detecting means uses the position of the center of gravity of the robot apparatus or an N-th order differential value of the position of the center of gravity as the kinematic state of the robot apparatus;
    target kinematic state calculating means for calculating a next-moment target kinematic state of the robot apparatus based on the solution to the equation of motion found by the real-time equation-of-motion solving means under the set boundary condition; and
    motion-pattern generating means for generating a motion pattern of the robot apparatus on the basis of the target kinematic state.

2. A robot apparatus according to claim 1, wherein the current kinematic state is the kinematic state of the robot apparatus in the present control cycle, and the next-moment target kinematic state is the target kinematic state of the robot apparatus in the next control cycle.

3. A robot apparatus according to claim 1, wherein the real-time equation-of-motion solving means uses the ZMP equation as the equation of motion.

4. A robot apparatus according to claim 2, wherein the moving means is a leg including movable parts and links, wherein the robot apparatus further comprises:
    real-time trajectory generating means for calculating a trajectory of the position or orientation of a leading-end link of the links in the leg in each control cycle; and
    environmental-state measuring means for measuring the state of an environment surrounding the robot apparatus, wherein the real-time trajectory generating means calculates the position and orientation of a leading-end link of the links on the basis of the actual environmental state measured by the environmental-state measuring means, and wherein the motion-pattern generating means generates a motion pattern of the robot apparatus on the basis of the position and orientation of the leading-end link and the target kinematic state.

5. A robot apparatus according to claim 1, further comprising:
    external-force detecting means for detecting the external force or external moment acting on the robot apparatus, wherein the real-time equation-of-motion solving means finds the solution to the equation of motion based on the external force or moment calculated by the external-force detecting means.

6. A control method for a robot apparatus having a moving portion, the method comprising:
    detecting a kinematic state of the robot apparatus;
    finding a solution to an equation of motion with a boundary condition concerning the kinematic state of the robot apparatus;
    setting a current kinematic state detected in the detecting as a boundary condition of the equation of motion; wherein the position of the center of gravity of the robot apparatus or an N-th order differential value of the position of the center of gravity is used as the kinematic state of the robot apparatus in the detecting;
    calculating a next-moment target kinematic state of the robot apparatus based on the solution to the equation of motion found in the finding under the set boundary condition; and
    generating a motion pattern of the robot apparatus on the basis of the target kinematic state.

7. A control method for a robot apparatus according to claim 6, wherein the current kinematic state is the kinematic state of the robot apparatus in the present control cycle, and the next-moment target kinematic state is the target kinematic state of the robot apparatus in the next control cycle.

8. A control method for a robot apparatus according to claim 6, wherein the ZMP equation is used as the equation of motion in the finding.

9. A control method for a robot apparatus according to claim 6, wherein the moving portion is a leg including movable parts and links, wherein the control method further comprises:
    calculating a trajectory of the position or orientation of a leading-end link of the links in the leg in each control cycle; and
    measuring the state of an environment surrounding the robot apparatus,
    wherein the position and orientation of the leading-end link are calculated in the calculating on the basis of the actual environmental state measured in the measuring, and wherein a motion pattern of the robot apparatus is generated on the basis of the position and orientation of the leading-end link and the target kinematic state in the generating.

10. A control method for a robot apparatus according to claim 6, further comprising:
    detecting the external force or external moment acting on the actual robot apparatus, wherein the solution to the equation of motion is found in the finding based on the external force or moment calculated in the detecting the external force or external moment.

11. A robot apparatus having a moving portion, the robot apparatus comprising:
    a state detector configured to detect a kinematic state of the robot apparatus;
    a real-time equation-of-motion solving unit configured to find a solution to an equation of motion with a boundary condition concerning the kinematic state of the robot apparatus;
    a boundary-condition setting unit configured to set a current kinematic state detected by the state detector as a boundary condition of the equation of motion; wherein the state detector is configured to use the position of the center of gravity of the robot apparatus or an N-th order differential value of the position of the center of gravity as the kinematic state of the robot apparatus;
    a target kinematic state calculating unit configured to calculate a next-moment target kinematic state of the robot apparatus based on the solution to the equation of motion found by the real-time equation-of-motion solving unit under the set boundary condition; and
    a motion-pattern generator configured to generate a motion pattern of the robot apparatus on the basis of the target kinematic state.

12. A robot apparatus according to claim 11, wherein the current kinematic state is the kinematic state of the robot apparatus in the present control cycle, and the next-moment target kinematic state is the target kinematic state of the robot apparatus in the next control cycle.

13. A robot apparatus according to claim 11, wherein the real-time equation-of-motion solving unit is configured to use the ZMP equation as the equation of motion.

14. A robot apparatus according to claim 12, wherein the moving portion is a leg including movable parts and links, wherein the robot apparatus further comprises:
    a real-time trajectory generator configured to calculate a trajectory of the position or orientation of a leading-end link of the links in the leg in each control cycle; and
    a environmental-state measuring unit configured to measure the state of an environment surrounding the robot apparatus, wherein the real-time trajectory generator is configured to calculate the position and orientation of a leading-end link of the links on the basis of the actual environmental state measured by the environmental-state measuring unit, and wherein the motion-pattern generator is configured to generate a motion pattern of the robot apparatus on the basis of the position and orientation of the leading-end link and the target kinematic state.

15. A robot apparatus according to claim 11, further comprising:
    an external-force detector configured to detect the external force or external moment acting on the robot apparatus, wherein the rear-time equation-of-motion solving unit is configured to find the solution to the equation of motion based on the external force or moment calculated by the external-force detector.

16. A robot apparatus according to claim 11, wherein the real-time equation-of-motion solving unit is configured to solve the equation of motion which a boundary between a present control cycle and a next control cycle selected such that a trajectory of a zero moment (ZMP) has zero acceleration.

17. A robot apparatus according to claim 11, wherein the real-time equation-of-motion solving unit is configured to solve the equation of motion which a boundary between a present control cycle and a next control cycle selected such that a height of a center of gravity of the apparatus is constant.

18. A robot apparatus according to claim 11, wherein the real-time equation-of-motion solving unit is configured to solve the equation of motion which a boundary between a present control cycle and a next control cycle selected such that an external moment on the apparatus is constant.

19. A robot apparatus according to claim 11, wherein the state detector includes a gyroscope.

20. A robot apparatus according to claim 11, wherein the state detector includes an accelerometer.

* * * * *